(12) United States Patent
Feng et al.

(10) Patent No.: US 11,086,075 B2
(45) Date of Patent: Aug. 10, 2021

(54) FIBER ARRAY UNITS WITH MODE-FIELD DIAMETER CONVERSION, AND FABRICATION METHOD

(71) Applicant: ALLIANCE FIBER OPTIC PRODUCTS, INC., Sunnyvale, CA (US)

(72) Inventors: Ximao Feng, San Mateo, CA (US); Chunlei He, Sunnyvale, CA (US); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 16/668,592

(22) Filed: Oct. 30, 2019

(65) Prior Publication Data

US 2021/0132293 A1    May 6, 2021

(51) Int. Cl.
    *G02B 6/255*     (2006.01)
    *G02B 6/245*     (2006.01)

(52) U.S. Cl.
    CPC .......... *G02B 6/2555* (2013.01); *G02B 6/245* (2013.01)

(58) Field of Classification Search
    None
    See application file for complete search history.

(56) References Cited

U.S. PATENT DOCUMENTS

| | | | | |
|---|---|---|---|---|
| 6,728,450 | B2* | 4/2004 | Tombling | G02B 6/3636 385/49 |
| 6,859,588 | B2* | 2/2005 | Kim | G02B 6/30 385/49 |
| 7,021,842 | B2 | 4/2006 | Yamada et al. | |
| 9,167,626 | B1 | 10/2015 | Wu | |
| 2003/0059180 | A1* | 3/2003 | Tamura | G02B 6/262 385/96 |
| 2003/0152343 | A1* | 8/2003 | Yamada | G02B 6/3846 385/99 |
| 2004/0005126 | A1* | 1/2004 | Yablon | G02B 6/2551 385/95 |
| 2004/0062495 | A1* | 4/2004 | Tsuzaki | G02B 6/2551 385/96 |
| 2007/0036499 | A1* | 2/2007 | Shukunami | G02B 6/2551 385/128 |
| 2008/0037939 | A1* | 2/2008 | Xiao | G02B 6/2551 385/96 |

(Continued)

*Primary Examiner* — Tina M Wong
(74) *Attorney, Agent, or Firm* — Grant A. Gildehaus

(57) ABSTRACT

A fiber array unit (FAU) includes a substrate, a cover element, and a plurality of optical fibers each including a splice joint connecting fibers of different mode-field diameters with a recoating material arranged over at least a portion of the fibers overlapping the substrate, wherein stripped portions of the fibers are arranged in grooves between the substrate and the cover element. A method for fabricating a compact FAU includes splicing ends of stripped sections of first and second optical fiber segments of different mode-field diameters, applying a recoating material over at least portions of the stripped sections, positioning portions of stripped sections of the second optical fiber segments in grooves defined in a substrate, and arranging a cover over the grooves. Certain embodiments include stripping recoating material portions of the second optical fiber segments before they are placed in the grooves.

9 Claims, 7 Drawing Sheets

(56) References Cited

U.S. PATENT DOCUMENTS

| | | | |
|---|---|---|---|
| 2012/0170899 A1* | 7/2012 | Homma | G02B 6/2558 385/99 |
| 2014/0248023 A1* | 9/2014 | Nishimura | G02B 6/4296 385/96 |
| 2016/0154189 A1 | 6/2016 | Elliott | |
| 2016/0370543 A1* | 12/2016 | Ocampo | C03C 25/106 |
| 2017/0322371 A1* | 11/2017 | Iwase | H01S 5/141 |
| 2019/0113702 A1* | 4/2019 | Fujita | G02B 6/46 |
| 2019/0276550 A9* | 9/2019 | Chen | A61K 47/6803 |
| 2020/0081182 A1* | 3/2020 | Hawke | G02B 6/245 |
| 2020/0081186 A1* | 3/2020 | Wu | G02B 6/443 |
| 2020/0116938 A1* | 4/2020 | Beranek | G02B 6/25 |
| 2020/0292761 A1* | 9/2020 | Nakazato | G02B 6/3636 |
| 2020/0310033 A1* | 10/2020 | Hasegawa | G02B 6/2558 |

\* cited by examiner

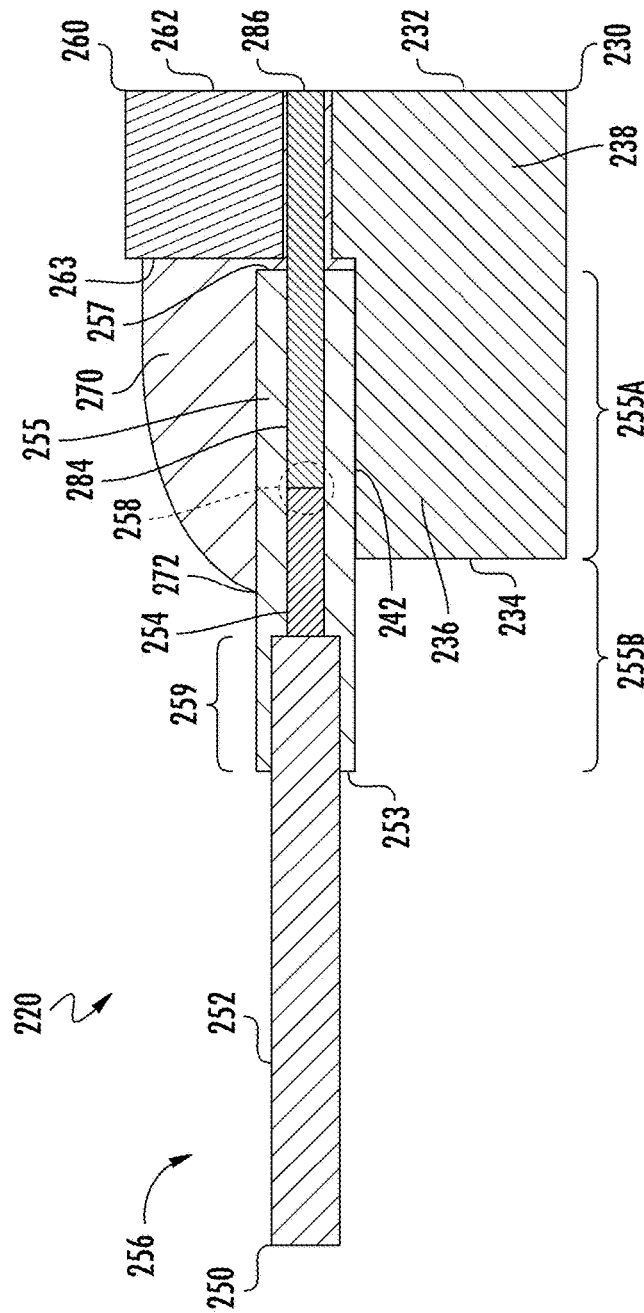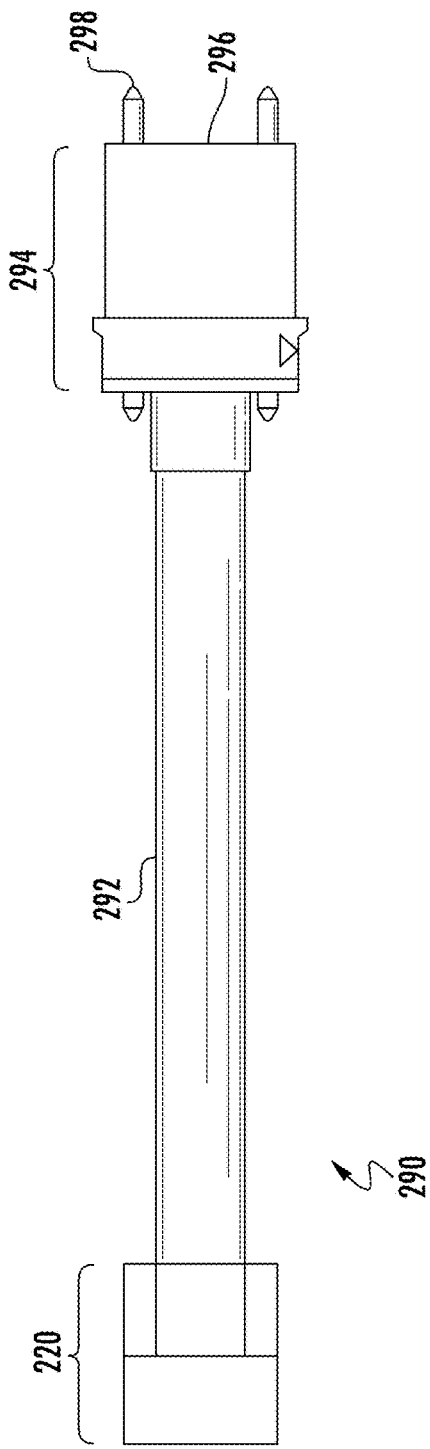

FIBER ARRAY UNITS WITH MODE-FIELD DIAMETER CONVERSION, AND FABRICATION METHOD

BACKGROUND

The disclosure relates generally to fiber array units that facilitate connection of optical fibers to optical waveguide devices, and specifically to fiber array units providing mode-field diameter conversion utility and that are compact in size, as well as methods for fabricating the same.

Optical fibers are useful in a wide variety of applications, including the telecommunications industry for voice, video, and data transmission. FIG. 1 is a cross-sectional view of an exemplary coated optical fiber 10 that includes a glass core 12, glass cladding 14 surrounding the glass core 12, and a polymer coating 20 (which may include multiple coating layers, such as an inner primary coating layer 16 and an outer secondary coating layer 18) surrounding the glass cladding 14. The inner primary coating layer 16 may be configured to act as a shock absorber to minimize attenuation caused by any micro-bending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 μm, about 250 μm, or any other suitable value.

Optical fiber fusion splicing, which is the process by which a permanent, low-loss, high-strength, fused (or welded) joint is formed between two optical fibers, typically involves multiple tasks. First, polymer coatings (e.g., coating layers 16, 18 of FIG. 1) of coated optical fibers (e.g., coated optical fiber 10 of FIG. 1) are stripped to expose glass cladding (e.g., glass cladding 14 of FIG. 1). Next, flat fiber end faces are formed, typically by cleaving exposed glass portions of the fibers. Then the fibers are laterally aligned to each other. The fiber tips are heated to their softening point and pressed together to form a joint. Checks such as loss estimation and proof testing (to ensure long-term mechanical reliability) may be performed. The completed fusion splice must also be protected from the environment using packaging, which serves to shield fiber surfaces from mechanical degradation (e.g., abrasion) and chemical degradation (e.g., humidity) to ensure that splices exhibit long-term reliability. Optical fibers must typically be able to withstand service temperatures spanning at least a range of from −40° C. to 85° C. without suffering significant mechanical and/or optical performance degradation.

Each potential path that light propagates through an optical fiber is known as a guided mode of the fiber. Depending on the physical dimensions of the core/cladding regions, refractive index, and wavelength, any number from one to thousands of modes can be supported within a single optical fiber. The two most common variants are single mode fiber (which supports a single guided mode) and multimode fiber (which supports a large number of guided modes). In a multimode fiber, lower-order modes tend to confine light spatially in the core of the fiber, whereas higher-order modes tend to confine light spatially near the core/cladding interface.

Relative to multimode optical fibers, single mode optical fibers have a much smaller core size and numerical aperture. In single mode optical fibers, about 80 percent of the light is carried in the core, while the remaining 20 percent is carried in a portion of the cladding close to the core. The core plus the portion of the cladding that carries the light is referred to as the mode-field, such that a mode-field diameter of a single mode optical fiber is larger than the core diameter. In multimode optical fibers, the concept of mode-field diameter is mostly of interest for the fundamental mode, since most modes are carried by the core. Single-mode fibers are preferred for use in long distance, high bandwidth runs, whereas multimode fibers are often used for short distance applications.

Optical fiber array units (FAUs) are devices used in coherent optical communication systems for coupling optical fibers to optical waveguide devices. A common type of FAU includes a plurality of V-grooves prepared by machining (e.g., sawing) or wet etching a glass plate (typically several millimeters thick), with a precision of ±1 μm, with optical fibers being arrayed along the grooves and fixed by an adhesive. An end surface of a fiber array unit including fiber ends is optically polished to provide an interface by which the fibers may be optically coupled to optical input/output devices, such as waveguides, transceivers, photonic integrated circuits (PICs), photodetector arrays, laser emitter arrays, etc. The use of FAUs to accurately position optical fiber cores at a known fiber pitch avoids difficulties in separately aligning a large number of optical fibers to optical input/output devices.

An exploded view of a representative FAU 28 is shown in FIG. 2. The FAU 28 includes a substrate 30 that defines a plurality of grooves 46 are configured to receive stripped sections 54 of a plurality of optical fibers 50, and a cover element 60 configured to overlap the plurality of grooves 46. The substrate 30 includes a first end 32 and a second end 34, with an elevated region 38 defining the grooves 46 being closer to the first end 32, and with a flat region 36 being closer to the second end 34. A step 40 is provided between the flat region 36 and the elevated region 38. The flat region 36 includes an upper surface 42 without grooves, in contrast to the upper surface 44 of the elevated region 38 in which the grooves 46 are defined. The optical fibers 50 each include a stripped section 54 and a pre-coated section 52, wherein the grooves 46 are configured to receive portions of the stripped sections 54, and wherein the pre-coated sections 52 in addition to portions of the stripped sections 54 overlap the flat region 36 of the substrate 30. When the FAU 28 is assembled, a bottom surface 64 of the cover element 60 may be positioned over the upper surface 44 of the elevated region 38, and ends 56 of the optical fibers 50 may be polished flush with ends 32, 62 of the substrate 40 and the cover element 60. Additionally, epoxy (not shown) may be provided between the stripped sections 54, the grooves 46, and the bottom surface 64 of the cover element 60, and may be additionally provided to encapsulate the portions of the optical fibers 50 overlapping the flat region 36 of the substrate 30.

FAUs that provide mode-field conversion utility by splicing optical fibers of different mode-field diameters are known, such as disclosed in U.S. Pat. No. 7,021,842 to Yamada et al. One example of a FAU incorporating spliced optical fibers of different mode-field diameters is shown in FIGS. 3A-3C, which provides top, side-cross-sectional, and front elevational views, respectively, of a FAU 68. The FAU 68 includes a substrate 70, a plurality of optical fibers 90 received by a plurality of grooves 86 defined in the substrate 70, and a cover element 100 configured to overlap the plurality of grooves 86. The substrate 70 has an elevated region 78 arranged closer to a first end 72 of the substrate 70, a flat region 76 closer to a second end 74 of the substrate 70, and a step 80 between the elevated region 78 and the flat region 76. The cover element 100 includes a first end 102, a second end 103, and a lower surface 104. Each optical fiber 90 includes a first segment pre-coated section 92 (having a terminus 93), and a splice joint 96 arranged between a first segment stripped section 94 and a second segment stripped section 98. The elevated region 78 of the substrate 70 includes an upper surface 84 in which the plurality of grooves 86 are defined, with the plurality of grooves 86 receiving the second segment stripped sections 98 of the optical fibers 90. For each of the optical fibers 90, the first segment stripped section 94, the splice joint 96, a portion of the first segment pre-coated section 92, and a portion of the second segment stripped section 98 overlaps the flat portion 82 of the substrate 70. The FAU 68 includes a length L extending between the first and second ends 72, 74 of the substrate 70. An epoxy material 108 (as shown in FIG. 3B) is arranged over the flat portion 76 of the substrate 70 to encapsulate the splice joint 96 and portions of the optical fibers 90 that overlap the flat portion 82, with epoxy material 108 also provided between adjacent surfaces 104, 84 of the cover member 100 and the substrate 70 (as shown in FIG. 3C) to retain the second segment stripped sections 98 in the grooves 86. As shown in FIG. 3B, an end of the second segment stripped section 98 of the optical fiber 90 is polished flush with the first ends 72, 102 of the substrate 70 and the cover element 100, respectively.

Conventional techniques for producing FAUs such as shown in FIGS. 3A-3C include performing fusion splicing to ends of stripped sections of optical fibers after they have been received between a cover element and V-grooves defined in a substrate. Due to size constraints of fusion splicing apparatuses, each of the two stripped sections used to form a single splice cannot be shorter than 3 mm. This means that the length from a splice joint to one (e.g., rear) end of a FAU must have a length of at least 3 mm. In practice, this usually means that the lower limit of length for a FAU including V-grooves is at least 4 mm; otherwise, stripped sections may dangle beyond the substrate of a FAU, leading to reduced reliability.

Current trends provide for reducing size of optical transceivers contained in various devices, include PICs. To accommodate demands for reduced device size, there is a need in the art for FAUs of reduced size (e.g., smaller footprint) and that provide mode-field diameter conversion utility.

SUMMARY

One aspect of the disclosure relates to a fiber array unit comprising a substrate defining a first plurality of grooves; a cover element configured to overlap at least a portion of the substrate over the first plurality of grooves; and a plurality of optical fibers each including a first optical fiber segment, a second optical fiber segment, and a splice joint. For each optical fiber of the plurality of optical fibers: the first optical fiber segment comprises a first mode-field diameter, a pre-coated section, and a first stripped section; the second optical fiber segment comprises a second mode-field diameter and a second stripped section, wherein the second mode-field diameter differs from the first mode-field diameter; the splice joint is arranged between ends of the first stripped section and the second stripped section; and a recoating material arranged over at least a portion of the first stripped section, and extending from the pre-coated section in a direction toward the splice joint to form a recoated section of the first optical fiber segment. The second optical fiber segments of the plurality of optical fibers are received within the first plurality of grooves between the substrate and the cover element. Additionally, for each optical fiber of the plurality of optical fibers, a first portion of the recoated section of the first optical fiber segment overlaps the substrate, and a second portion of the recoated section of the first optical fiber segment extends beyond a first end of the substrate.

Another aspect of the disclosure relates to a method for fabricating a fiber array unit. Such method comprises providing a plurality of optical fibers each including a first optical fiber segment, a second optical fiber segment, and a splice joint, wherein for each optical fiber of the plurality of optical fibers: the first optical fiber segment comprises a first mode-field diameter, a first pre-coated section, and a first stripped section; the second optical fiber segment comprises a second mode-field diameter and a second stripped section, wherein the second mode-field diameter differs from the first mode-field diameter; and the splice joint is arranged between ends of the first stripped section and the second stripped section. The method additionally comprises, for each optical fiber of the plurality of optical fibers, applying a recoating material over at least a portion of the first stripped sections, wherein the recoating material extends from the first pre-coated section in a direction toward the splice joint to form a recoated section of the first optical fiber segment. The method further comprises positioning portions of the second optical fiber segments of the plurality of optical fibers in a first plurality of grooves defined in a substrate, while causing, for each optical fiber of the plurality of optical fibers, (i) a first portion of the recoated section of the first optical fiber segment to overlap the substrate, and (ii) a second portion of the recoated section of the first optical fiber segment to extend beyond a first end of the substrate. The method additionally comprises positioning a cover element to overlap at least a portion of the substrate over the first plurality of grooves, with the portions of the second optical fiber segments arranged between the substrate and the cover element.

In another aspect, any two or more features described in connection with the foregoing aspects and/or other embodiments disclosed herein may be combined for additional advantage.

Additional features and advantages will be set out in the detailed description that follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 5G is a side cross-sectional view of a complete FAU including the elements of FIG. 5F, following addition of adherent material (e.g., epoxy) to encapsulate the optical fibers in areas overlapping the substrate and to adhere the cover element to the substrate, and following optical polishing of fiber ends flush with ends of the substrate and the cover element.

FIG. 6 is a top plan view of a fiber optic cable assembly including a FAU according to one embodiment disposed at a first end, and including a multi-fiber push-on connector at a second end.

DETAILED DESCRIPTION

Figure 1:
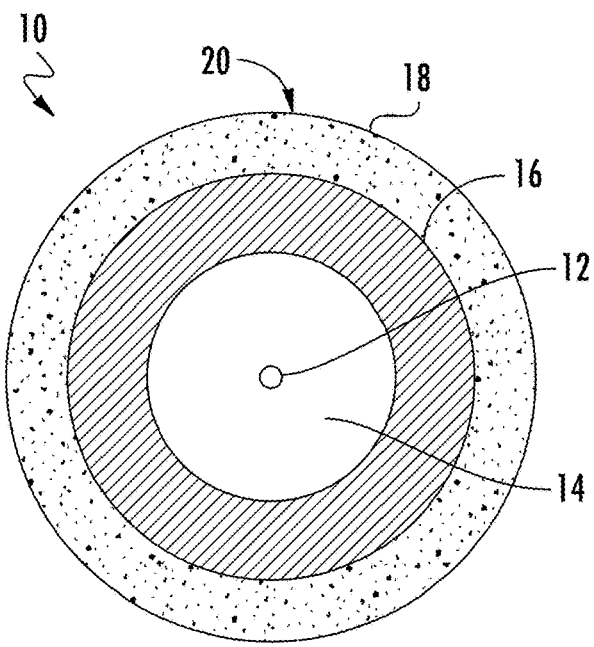
FIG. 1 is a cross-sectional view of an exemplary coated optical fiber 10 that includes a glass core, glass cladding surrounding the glass core, and a multi-layer polymer coating surrounding the glass cladding.
Figure 2:
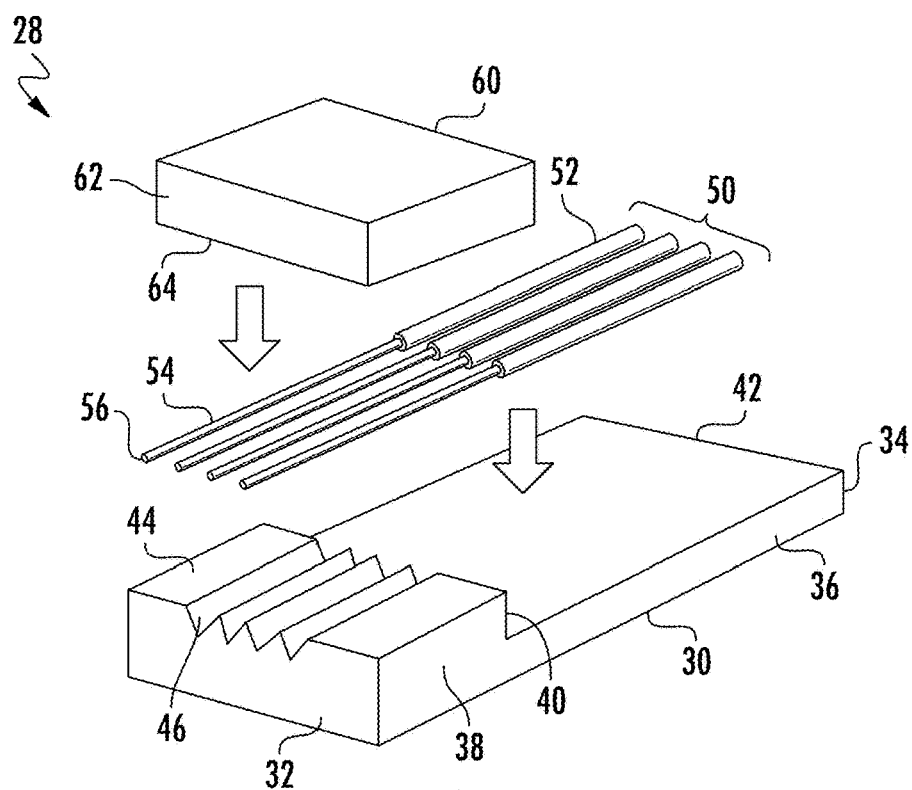
FIG. 2 is an exploded perspective view of a first conventional fiber optic array unit (FAU).
Figure 3A:
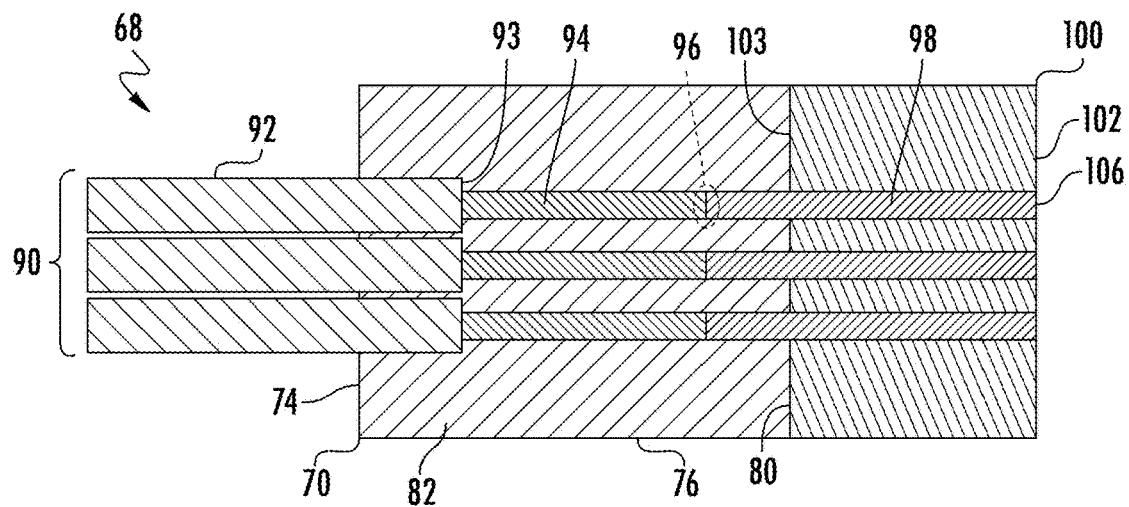
FIG. 3A is a top plan view of a second conventional FAU that provides mode-field conversion utility by splicing optical fibers of different mode-field diameters.
Figure 3B:
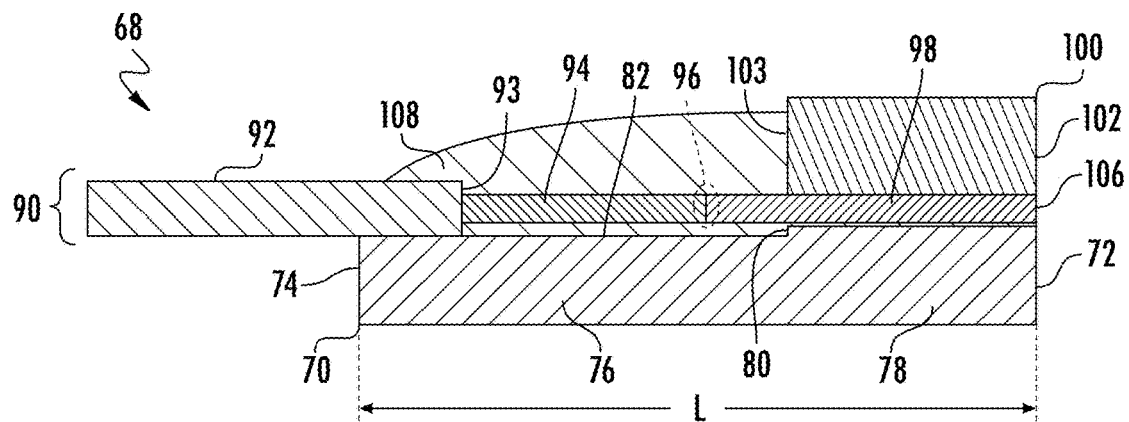
FIG. 3B is a side cross-sectional view of the FAU of FIG. 3A.
Figure 3C:
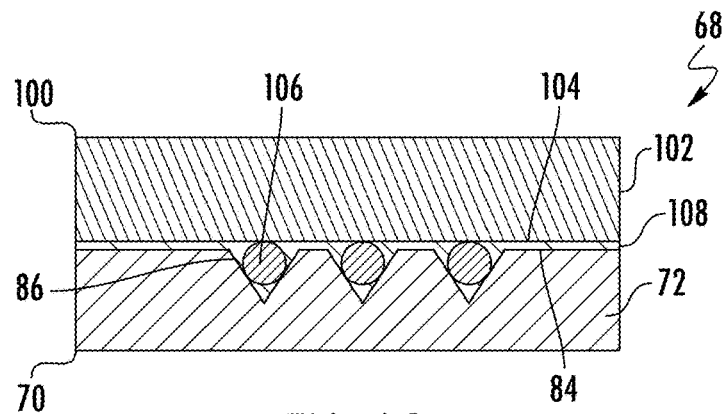
FIG. 3C is a front elevational view of the FAU of FIGS. 3A and 3B.

Reference will now be made in detail to the presently preferred embodiments, examples of which are illustrated in the accompanying drawings. Whenever possible, the same or corresponding reference numerals will be used throughout the drawings to refer to the same or like parts.

The embodiments set out below represent the information to enable those skilled in the art to practice the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Reference Numbers and Terminology

The use herein of ordinals in conjunction with an element is solely for distinguishing what might otherwise be similar or identical labels, such as "first layer" and "second layer," and does not imply a priority, a type, an importance, or other attribute, unless otherwise stated herein.

The term "about" as used herein in conjunction with a numeric value means any value that is within a range of ten percent greater than or ten percent less than the numeric value.

The term "substantially" used herein in conjunction with a geometric property or characteristic (e.g., "substantially flush") includes slight deviations from the geometric property/characteristic in question due to manufacturing limitations and tolerances.

In this disclosure, when numerical ranges are discussed (e.g., "X to Y" or "between X and Y", with X and Y being integers), the ranges include the stated end points.

As used herein, the articles "a" and "an" in reference to an element refers to "one or more" of the element unless otherwise explicitly specified. The word "or" as used herein is inclusive unless contextually impossible. As an example, the recitation of A or B means A, or B, or both A and B.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In this disclosure, the term "optical fiber" (or "fiber") is used in a generic sense and may encompass bare optical fibers, coated optical fibers, or buffered optical fibers, as well as optical fibers including different sections corresponding to these fiber types, unless it is clear from the context which of the types is intended. "Bare optical fibers" (including "bare glass optical fibers") or "bare sections" are those with no coating present on the fiber cladding. "Coated optical fibers" or "coated sections" include a single or multi-layer coating (typically an acrylic material) surrounding the fiber cladding and have a nominal (i.e., stated) diameter no greater than twice the nominal diameter of the bare optical fiber.

Groups of coated optical fibers (e.g., at least 4, 8, 12, or 24 optical fibers) may be held together using a matrix material, intermittent inter-fiber binders ("spiderwebs"), or tape to form "optical fiber ribbons" or "ribbonized optical fibers" to facilitate packaging either within or outside of cables, with each fiber having a different color for ease of identification. For example, ribbonized optical fibers are widely used in cables for high capacity transmission systems In this disclosure, the language "fusion spliced optical fiber" refers to two optical fibers that have been fusion spliced together to form a permanent, optical link incorporating the two optical fibers. Further, the language "fusion spliced optical fiber" may be shortened to simply "optical fiber" when the context is clear that two optical fibers have been fusion spliced together. The singular noun "fusion spliced optical fiber" or "optical fiber" is used even though two optical fibers are initially present because, after fusion splicing, the resulting optical link is defined by continuous material and intended to function like a continuous optical fiber (even though there may be some attenuation resulting from the fusion splice joint). Using the singular form also facilitates discussions involving groups of these fusion spliced optical fibers, as will be apparent. A fusion spliced optical fiber may desirably include a polymeric overcoating over the fusion splice joint as well as over stripped portions of optical fibers proximate to the fusion splice joint.

Likewise, in this disclosure, the two optical fibers that define a given "fusion spliced optical fiber" may alternatively be referred to as "optical fiber segments." Using the language "optical fiber segments" rather than "optical fibers" helps clarify when the disclosure is referring to one of the pairs of optical fibers that form one of the fusion spliced optical fibers, versus one of the fusion spliced optical fibers itself.

This disclosure also refers to optical fiber segments having various "sections," such as "stripped sections." It will be clear from the context that, in some instances, a section of an optical fiber segment may be coextensive with the length of the optical fiber segment. For example, in some instances it will be clear that an optical fiber segment comprising a "stripped section" does not necessarily mean that there is some other, adjacent unstripped section; this is not the case unless the context makes clear otherwise Fiber Optic Array Units and Fabrication Methods Various embodiments will be further clarified by examples in the description below. In general, the description relates to a fiber array unit (FAU) that includes a substrate defining a plurality of grooves, a cover element, and a plurality of optical fibers each including a splice joint connecting fibers of different mode-field diameters with a recoating material. The recoating material is: (i) arranged over at least a portion of the fibers overlapping the substrate and (ii) arranged over portions of the fiber extending beyond an end of the substrate. Stripped portions of the fibers are arranged in the grooves and covered by cover element. Additionally, a method for fabricating a compact FAU includes splicing ends of stripped sections of first and second optical fiber segments of different mode-field diameters, applying a recoating material over at least portions of the stripped sections, positioning portions of stripped sections of the second optical fiber segments in grooves defined in a substrate, and arranging a cover over the grooves. Recoating material may be stripped from portions of the second optical fiber segments before they are placed in the grooves. Methods disclosed herein may be used to produce FAUs that are more compact (e.g., shorter) than conventional FAUs that provide mode conversion utility, while simplifying fabrication and without sacrificing FAU reliability.

Optical fiber fusion splicing is the process by which a permanent, low-loss, high-strength, fused (or welded) joint is formed between two optical fibers. The ultimate goal of optical fiber fusion splicing is to create a joint with no optical loss, yet with mechanical strength and long-term reliability that matches an unspliced continuous fiber.

In certain embodiments, coated optical fibers subject to being fusion spliced and encapsulated according to methods disclosed herein are prepared for fusion splicing (e.g., by stripping ends thereof) utilizing non-contact fiber stripping methods and/or apparatuses, such as those disclosed in U.S. Pat. No. 9,167,626 ("the '626 Patent"), which is hereby incorporated by reference herein. Non-contact stripping methods using lasers or hot gases, as well as contact stripping methods (i.e., mechanical stripping), are also possible in certain embodiments.

Figure 4A:
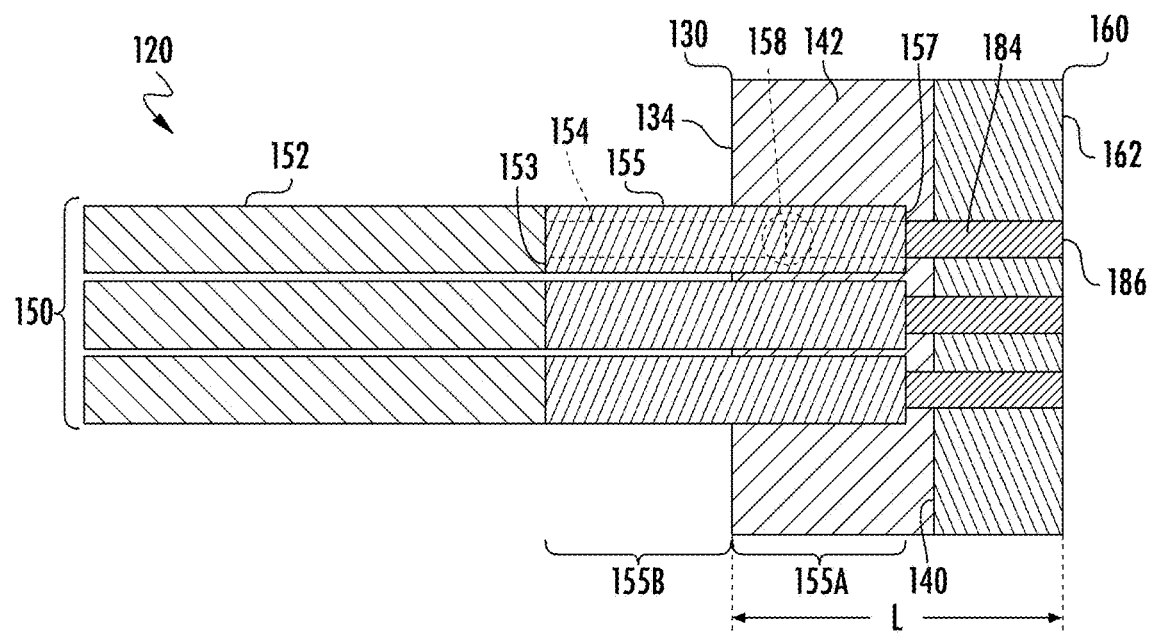
FIG. 4A is a top plan view of a FAU according to one embodiment, the FAU providing mode-field conversion utility and including recoating material over a splice region and stripped portions of optical fiber segments, with a portion of the recoating material arranged over a substrate, and another portion of the recoating material extending beyond an end of the substrate.
Figure 4B:
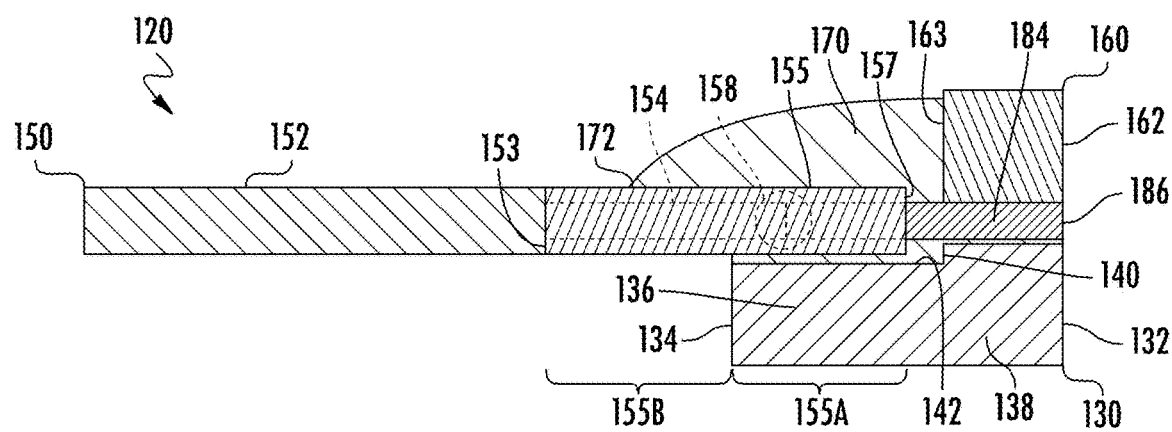
FIG. 4B is a side elevational view of the FAU of FIG. 4A.
Figure 4C:
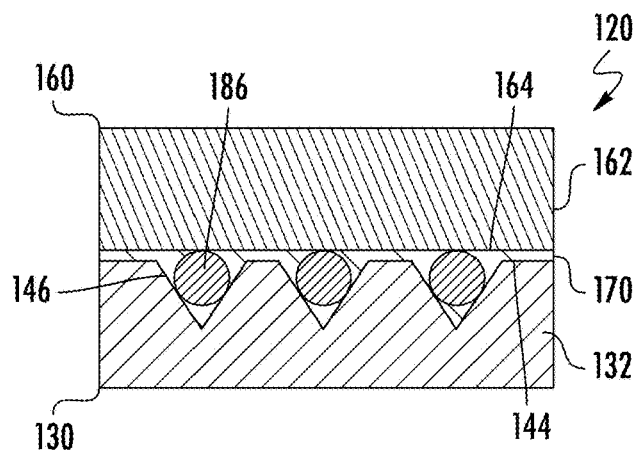
FIG. 4C is a front elevational view of the FAU of FIGS. 4A and 4B.

FIGS. 4A-4C provide top plan, side elevational, and front views, respectively, of a FAU 120 providing mode-field conversion utility according to one embodiment. The FAU 120 includes a substrate 130, a plurality of optical fibers 150 received by a plurality of grooves 146 defined in an upper surface 144 of the substrate 130, and a cover element 160 configured to overlap the plurality of grooves 146. The substrate 130 has an elevated region 138 arranged closer to a first end 132 of the substrate 130, a flat region 136 closer to a second end 134 of the substrate 130, and a step 140 between the elevated region 138 and the flat region 136. The cover element 160 includes a first end 162, a second end 163, and a lower surface 164. Each optical fiber 150 includes a first segment pre-coated section 152 ("first pre-coated section 152"), and a splice joint 158 arranged between a first segment stripped section 154 ("first stripped section 154") and a second segment stripped section 184 ("second stripped section 184"). Each optical fiber 150 additionally includes a recoating material 155 arranged over the splice joint 158, over the first segment stripped section 154, and over a portion of the second segment stripped section 184. The first segment stripped section 154 has a first mode-field diameter that differs from a second mode-field diameter of the second segment stripped section 184. In certain embodiments, the first mode-field diameter is 3 microns or more greater than the second mode-field diameter, or between 3 to 9 microns greater than the second mode-field diameter. For example, in certain embodiments, the first mode-field diameter is in a range of 9 to 11 microns, and the second mode-field diameter is in a range of 2 to 6 microns. The elevated region 138 of the substrate 130 includes an upper surface 144 in which the plurality of grooves 146 are defined, with the plurality of grooves 146 receiving the second segment stripped sections 184 of the optical fibers 150.

In certain embodiments, the recoating material 155 is compositionally matched to a coating material of the first segment pre-coated section 152 of each optical fiber 150. Such materials may include polymers such as (but not limited to) acrylate, silicone, polyimide, and hard optical polymer. In certain embodiments, the recoating material 155 differs compositionally from a coating material of the first segment pre-coated section 152 of each optical fiber 150.

As shown in FIGS. 4A and 4B, for each of the optical fibers 150, a first portion 155A of the recoating material 155 overlaps a top surface 142 of the flat region 136 of the substrate 130, and a second portion 155B of the recoating material 155 extends beyond the second end 134 of the substrate 130. This arrangement beneficially provides structural support for the splice joints 158 and the stripped sections 154, 184 encapsulated by the recoating material 155, and prevents contact pressure and/or abrasion along the second end 134 of the substrate 130 from comprising the integrity or optical performance of the optical fibers 150. In certain embodiments, first portion 155A of the recoating material 155 for each optical fiber 150 has a length that exceeds a length of the second portion 155B; in other embodiments, the first and second portions 155A, 155B may have substantially the same lengths, or the second portions 155B may have lengths that exceed those of the first portions 155A. Although FIGS. 4A and 4B show the splice joint 158 of each optical fiber 150 as overlapping the flat region 136 of the substrate 130, in certain embodiments the splice joint 158 may be arranged beyond the second end 134 of the substrate 130 without overlapping the flat region 136. Such figures also show an interface 153 between the first segment pre-coated section 152 and the recoating material 155, as well as a terminal end 157 of the recoating material 155. In certain embodiments, the recoating material 155 has substantially the same outer diameter as the first segment pre-coated section 152. In certain embodiments, the recoating material 155 overlaps a short length of the first segment pre-coated section 152, with the recoating material 155 having an outer diameter that exceeds an outer diameter of the first segment pre-coated section 152 (e.g., by a value of no more than fifteen percent greater than a diameter of the first segment pre-coated section 152).

The FAU 120 includes a length L extending between the first and second ends 132, 134 of the substrate 130. In certain embodiments, the length L is less than or equal to one of the following thresholds: 3 mm, 2.5 mm, 2.0 mm, 1.8 mm, or 1.5 mm, or L may be in a range of 1.2 mm to 3 mm. An epoxy material 170 (as shown in FIG. 4B) is arranged over the flat region 136 of the substrate 130 to encapsulate the splice joint 158 and portions of the optical fibers 150 that overlap the flat region 136, with epoxy material 170 also provided between adjacent surfaces 164, 144 of the cover element 160 and the substrate 130, respectively (as shown in FIG. 4C), to retain the second segment stripped sections 184 in the grooves 146. In certain embodiments, a rear end 172 of the adherent material 170 may extend rearward past the second end 134 of the substrate 130, in areas where the adherent material 170 is in contact with the recoating material 155. As shown in FIG. 4B, an end of the second segment stripped section 186 of each optical fiber 150 is polished flush with the first ends 132, 162 of the substrate 130 and the cover element 160, respectively.

FIGS. 5A-5F illustrate assembly steps that may be used to fabricate a FAU according to certain embodiments. Although the side views therein appear to depict segments of only a single optical fiber, it is to be appreciated that the steps illustrated therein are intended to be performed for first and second groups of optical fiber segments, such as may emanate from optical fiber ribbons, to facilitate fabrication of a FAU that includes any desired number of optical fibers.

Figure 5A:
FIG. 5A is a side cross-sectional view of two groups of stripped optical fiber segments of different mode-field diameters prior to fusion splicing of ends thereof.

FIG. 5A is a side cross-sectional view of first and second groups of optical fiber segments 250, 280 of differing first and second mode-field diameters, respectively, prior to fusion splicing of ends thereof. The first optical fiber segments 250 each include a pre-coated section 252 and a stripped section 254 ("first stripped section 254"). Similarly, the second optical fiber segments 280 each include a pre-coated section 282 and a stripped section 284 ("second stripped section 284"). In certain embodiments, each stripped section 254, 284 has a length of at least about 3 mm to facilitate reliable fusion splicing. In certain embodiments, each first mode-field diameter is 3 microns or more greater than each second mode-field diameter, or between 3 to 9 microns greater than each second mode-field diameter. For example, in certain embodiments, the first mode-field diameter is in a range of 9 to 11 microns, and each second mode-field diameter is in a range of 2 to 6 microns.

Figure 5B:
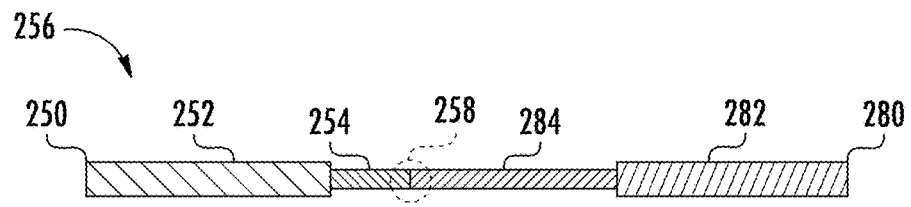
FIG. 5B is a side cross-sectional view of spliced optical fibers produced by fusion splicing ends of the groups of stripped optical fiber segments of FIG. 5A.

FIG. 5B is a side cross-sectional view of the first and second groups of optical fiber segments 250, 280 following fusion splicing of ends of the stripped sections 254, 284 to one another to produce fusion spliced optical fibers 256 each including a splice joint 258, with the pre-coated sections 252, 282 remaining unchanged.

Figure 5C:
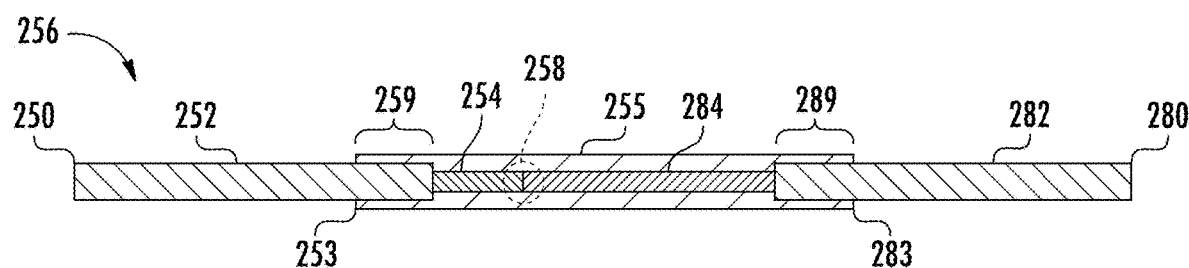
FIG. 5C is a side cross-sectional view of the spliced optical fiber groups of FIG. 5B following application of a recoating material over the spliced stripped sections and portions of the pre-coated sections thereof.

FIG. 5C is a side cross-sectional view of the fusion spliced optical fibers 256 of FIG. 5B, following application of a recoating material 255 to encapsulate the stripped sections 254, 284 and the splice joints 258. As shown, portions of the recoating material 255 (including ends 253, 283 thereof) also overlap portions of the pre-coated sections 252, 282 to form overlap regions 259, 289. Providing the recoating material 255 of sufficient length to overlap portions of at least the first pre-coated segments 252 at overlap regions 259 is desirable to ensure complete coverage of the stripped sections 254 for environmental protection. In certain embodiments, the recoating material 255 has an outer dimension (e.g., diameter, thickness, and/or width) that exceeds a corresponding outer dimension of the pre-coated sections 252, 254 by a factor of no greater than about 1.15 or 1.10 (i.e., no more than about fifteen percent or no more than about ten percent greater than a corresponding outer dimension of the pre-coated sections 252, 254). In certain embodiments, a recoating apparatus similar to that illustrated and described in connection with FIG. 7 (infra) may be used to apply the recoating material 255 to the spliced optical fiber groups shown in FIG. 5C.

Figure 5D:
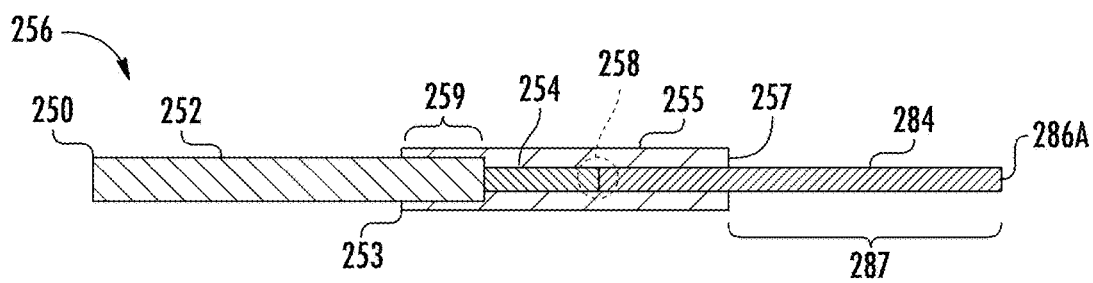
FIG. 5D is a side cross-sectional view of the spliced optical fiber groups of FIG. 5C following stripping of recoating material and pre-coating material from a portion of the second segment to form an optical fiber subassembly.

FIG. 5D is a side cross-sectional view of the spliced optical fiber groups of FIG. 5C following stripping of all coating material from the pre-coated sections 282 (of FIG. 5C), and stripping of a portion of the recoating material 255 from the stripped sections 284 (of FIGS. 5A-5C), to provide exposed lengths 287 of the stripped sections 284. In effect, at this point the stripped sections 284 are now coextensive with the length of the second optical fiber segments 280, with a portion of the stripped sections 284 remaining covered by the recoating material 255, and with the exposed lengths 287 of the stripped sections 284 extending from a terminus 257 of the recoating material 255 to fiber ends 286A. The exposed lengths 287 of the stripped sections 284 may be trimmed to a desired length, if desired. The splice joints 258, the remainder of the stripped sections 284 of the second group of optical fiber segments 280, and the entirety of the stripped sections 254 of the first group of optical fiber segments 250 (including portions of the pre-coated segments 252 at the overlap region 259) remain covered by the recoating material 255. The terminus 257 of the recoating material 255 may be arranged in contact with, or proximate to, the step 240 of the substrate 230 as well as the second end 263 of the cover element 260. The resulting subassembly of fusion spliced optical fibers 256 is ready for incorporation into a FAU.

Figure 5E:
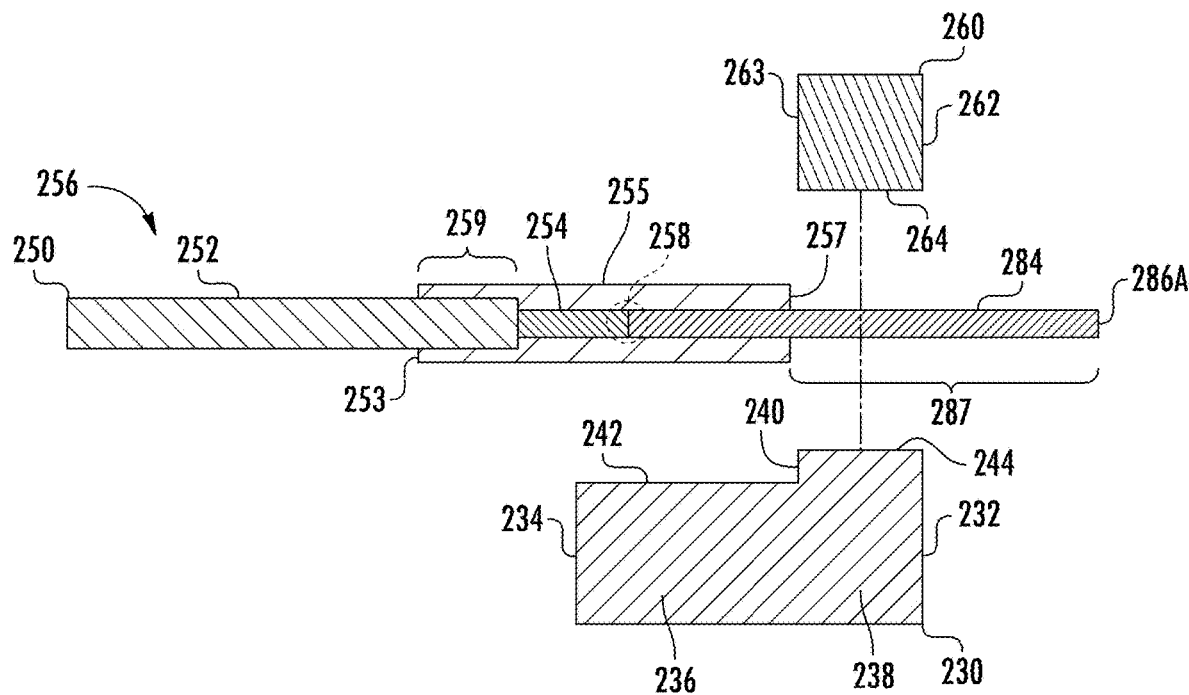
FIG. 5E is an exploded cross-section view of a FAU precursor incorporating the optical fiber subassembly of FIG. 5D, showing the optical fiber subassembly positioned between a substrate and a cover element prior to adhesion of the cover element to the substrate.

FIG. 5E is an exploded cross-section view of components of a FAU (e.g., a FAU precursor) incorporating the optical fiber subassembly of fusion spliced optical fibers 256 of FIG. 5D positioned between a substrate 230 and a cover element 260, prior to adhesion of the cover element 260 to or over the substrate 230. All of the elements previous described in FIG. 5D will not be described again in connection with FIG. 5E. The substrate 230 has an elevated region 238 arranged closer to a first end 232 of the substrate 230, a flat region 236 closer to a second end 234 of the substrate 230, and a step 240 between the elevated region 238 and the flat region 236. An upper surface 242 of the flat region 236 is devoid of grooves, whereas a plurality of grooves (not shown, but similar to the plurality of grooves 146 shown in FIG. 4B) is defined in an upper surface 244 of the elevated region 238. The plurality of grooves is positioned to receive the exposed lengths 287 of the stripped sections 284 (of optical fibers 250) that extend from the terminus 257 of the recoating material 255. The cover element 260 includes a first end 262, a second end 263, and a lower surface 264, wherein the lower surface 264 is configured to overlap the plurality of grooves defined in the upper surface 244 of the substrate 230.

Figure 5F:
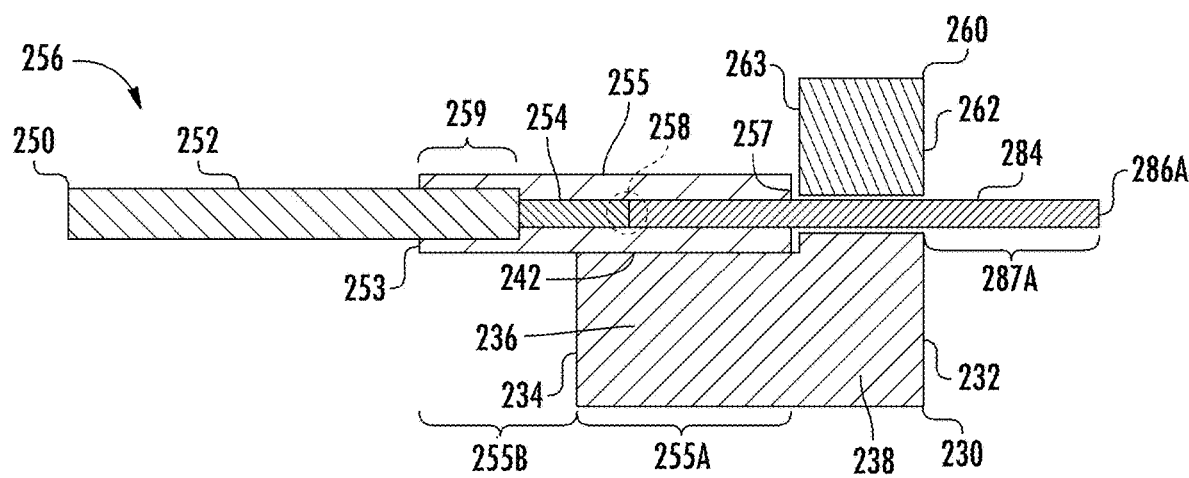
FIG. 5F is a side cross-sectional view of the FAU precursor in a partially assembled state with the optical fiber subassembly contacting the substrate and the cover element positioned over a stripped section produced from the FAU precursor of FIG. 5E.

FIG. 5F is a side cross-sectional view of the components of the FAU precursor of FIG. 5E in a partially assembled state, with the recoating material 255 arranged in contact with the upper surface 242 of the flat region 236, and with the stripped sections 284 extending between and through grooves enclosed by positioning of the cover element 260 over the elevated region 238 of the substrate 230. As shown, protruding exposed lengths 287A of the stripped sections 284 extend forward beyond the first ends 262, 232 of the cover element 260 and the substrate 230, respectively.

As shown in FIG. 5F, for each of the fusion spliced optical fibers 256, a first portion 255A of the recoating material 255 overlaps a top surface 242 of the flat region 236 of the substrate 230, and a second portion 255B of the recoating material 255 extends beyond the second end 234 of the substrate 230. This arrangement beneficially provides structural support for the splice joints 258 and the stripped sections 254, 284 that are encapsulated by the recoating material 255, and prevents contact pressure and/or abrasion along the second end 234 of the substrate 230 from comprising the integrity or optical performance of the optical fibers 256. The remaining elements of FIG. 5F are identical to the corresponding items shown and described in connection with FIGS. 5D and 5E, and will not be described again for brevity.

FIG. 5G is a side cross-sectional view of a complete FAU including the elements of FIG. 5F, following addition of adherent material 270 (e.g., epoxy) to encapsulate the recoating material 255 and stripped sections 284, 254 in areas overlapping the upper surface 242 of the flat region 236 of the substrate, and to adhere the cover element 260 to the substrate 230. FIG. 5G also shows the optical fibers segments 284 as having terminal ends 286 that are flush with first ends 262, 232 of the cover element 260 and the substrate 230, respectively. This may be the result of cutting (i.e., "cleaving") the optical fiber segments 284 close to the first ends 262, 232, and then polishing the terminal ends 286 of the optical fiber segments 284 to achieve a flush condition. In certain embodiments, these steps may be performed as part of the same processing operation (e.g., with a laser to effect cutting and result in the terminal ends 286 having sufficient flushness and optical quality). In certain embodiments, a rear end 272 of the adherent material 270 may extend rearward past the second end 234 of the substrate 230, in areas where the adherent material 270 is in contact with the recoating material 255. The remaining elements of FIG. 5G are identical to the corresponding items shown and described in connection with FIGS. 5D-5F, and will not be described again for brevity.

Although FIG. 5G shows the splice joint 158 of each optical fiber 256 as overlapping the flat region 236 of the substrate 230, in certain embodiments each splice joint 258 may be arranged beyond the second end 234 of the substrate 230 without overlapping the flat region 236. The presence of recoating material 255 over each splice joint 258 provides sufficient mechanical and environmental protection without necessarily requiring the adherent material 270 to encapsulate the splice joints 258. Concerning mechanical strength, pulling tests performed on optical fibers of eight FAUs produced in accordance with the method disclosed in connection with FIGS. 5A to 5G showed that all FAU fibers could withstand pull forces of at least 3.7 Newtons (N), with average pull test values of 5.8N, and with one FAU exhibiting a maximum pull test value of 9.0N.

FIGS. 5A to 5G and their corresponding descriptions therefore disclose a method for fabricating a FAU that provides mode-field diameter conversion. Since optical fiber segments are stripped and fusion spliced, and also at least partially recoated, before stripped segments are placed into a substrate, the length of a FAU may be reduced without concern that uncoated stripped segments may dangle beyond the end of a FAU substrate, potentially beyond the lateral extent of an epoxy encapsulation material. In certain embodiments, a method consistent with the foregoing disclosure comprises, for each optical fiber of the plurality of optical fibers, applying a recoating material over at least a portion of the first stripped sections, wherein the recoating material extends from the first pre-coated section in a direction toward the splice joint to form a recoated section of the first optical fiber segment. Thereafter, portions of the second optical fiber segments of the plurality of optical fibers may be positioned in a first plurality of grooves defined in a substrate, while causing, for each optical fiber of the plurality of optical fibers, (i) a first portion of the recoated section of the first optical fiber segment to overlap the substrate, and (ii) a second portion of the recoated section of the first optical fiber segment to extend beyond a first end of the substrate. After this positioning of the fibers, a cover element may be positioned to overlap at least a portion of the substrate over the first plurality of grooves, with the portions of the second optical fiber segments arranged between the substrate and the cover element.

In certain embodiments, the preceding method further comprises applying an adherent material arranged to adhere the cover element to the substrate, and arranged to encapsulate the plurality of optical fibers (i.e., including portions already encapsulated with recoating material) in areas in which the plurality of optical fibers overlap the substrate. In certain embodiments, a method further comprises stripping coatings from the pre-coated first and second optical fibers to form the first and second stripped sections, and fusion splicing ends thereof, for each of the optical fiber. In certain embodiments, the applying of the recoating material comprises applying the recoating material over the first stripped section, the splice joint, the second stripped section, and a portion of the first pre-coated section, for each of the optical fibers. In certain embodiments, the method further comprises stripping a portion of the recoating material from at least a portion of the second stripped section, for each of the optical fibers. In certain embodiments, the method further comprises cutting a portion of the second stripped section extending beyond the cover element to form a cut end, and polishing the cut end substantially flush with the cover element and the substrate proximate to a second end of the substrate that opposes the first end.

In certain embodiments, FAUs as disclosed herein may be incorporated into cable assemblies. FIG. 6 is a top plan view of a fiber optic cable assembly 290 including a FAU 220 according to one embodiment disposed at a first end, and a multi-fiber push-on (MPO) connector 294 (having alignment pins 298 and a ferrule surface 296) at a second end, with a multi-fiber cable 292 extending between the FAU 220 and the MPO connector 294. In certain embodiments, the multi-fiber cable 292 comprises at least one fiber ribbon, optionally contained within a jacket or other protective layer(s). Although only a single FAU and single MPO connector are shown in FIG. 6, it is to be appreciated that cable assemblies according to certain embodiments may include multiple FAUs and/or multiple connectors (e.g., MPO connectors), as suitable for the desired application.

Figure 7:
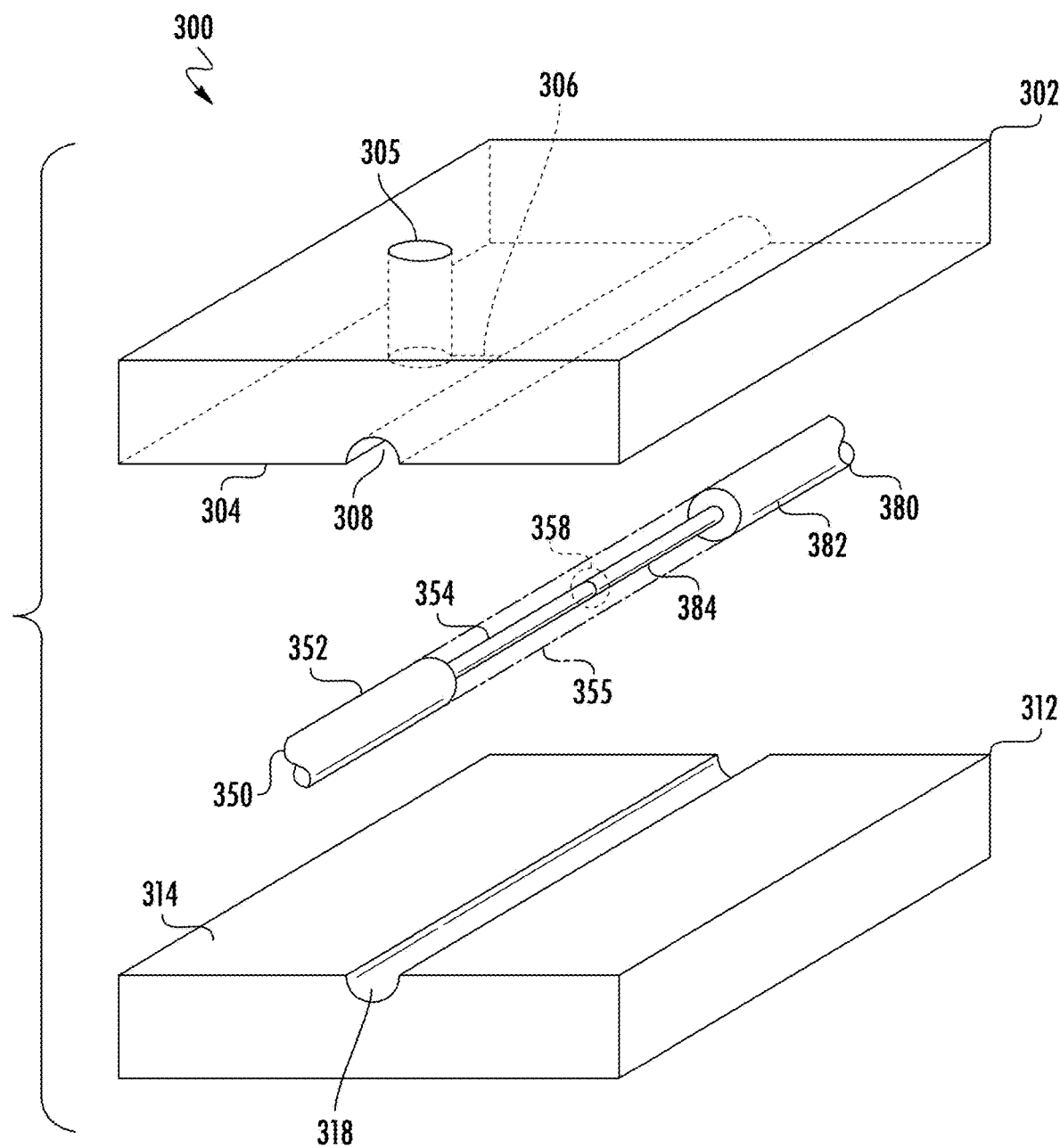
FIG. 7 is an exploded perspective view of a conventional recoating apparatus suitable for applying recoating material over spliced optical fibers.

FIG. 7 is an exploded perspective view of a conventional recoating apparatus 300 suitable for applying recoating material over spliced optical fibers. The recoating apparatus 300 includes an upper plate 302 having a lower mating surface 304, and a lower plate 312 having an upper mating surface 314. The respective mating surfaces 304, 314 each define a complementary semi-cylindrical channel 308, 318, with the semi-cylindrical channels 308, 318 in combination forming a cylindrical channel when the mating surfaces 304, 314 are placed in contact with one another. The upper plate 302 additionally includes a coating material admission port 305 and a channel 306 that are arranged to supply polymeric coating material (not shown) in a flowable state into the semi-cylindrical channel 308 of the upper plate 302. To perform a recoating operation, previously-spliced optical fiber segments 350, 380 (each having a pre-coated section 352, 382 and a stripped section 354, 384, with a splice joint 358 joining ends of the stripped sections 354, 384) are inserted into the semi-cylindrical channel 318 of the lower plate 312. Thereafter, the upper and lower plates 302, 312 are brought together to bring the mating surfaces 304, 314 into contact with one another. Flowable polymeric coating material (e.g., subject to being crosslinked by ultraviolet (UV) emissions or other polymerization means) supplied through the coating material admission port 305 and a channel 306 into the cylindrical area formed by the two adjacent semi-cylindrical channels 308, 318 to encapsulate the stripped sections 354, 384 and the splice joint 358. Thereafter, the coating material may be subject to UV curing or other curing means to solidify the coating material. After the coating material has solidified, the upper and lower plates 302, 312 are separated, and the previously-spliced optical fiber segments 350, 380 with recoating material 355 thereon may be removed from the plates 302, 312. Although FIG. 7 depicts a recoating apparatus 300 having only a single semi-cylindrical channel 308, 318 formed in the upper and lower plates 302, 312, it is to be appreciated that the apparatus 300 may be modified to provide a multitude of semi-cylindrical channels in parallel to permit regions of a large number of previously spliced fibers to be recoated simultaneously. One example of a commercially available recoating apparatus that may be used is a FSR-06 Optical Fiber Recoater produced by Fujikura Ltd. (Tokyo, Japan).

It will be apparent to those skilled in the art that various modifications and variations can be made without departing from the spirit or scope of the invention. For example, although not shown, the cover elements 160, 260 may define a plurality of grooves that are similar to the plurality of grooves 146 shown in FIG. 4B, with the grooves of the cover element being positioned over the grooves defined in the associated substrate 130, 230.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A method for fabricating a fiber array unit, the method comprising:
    providing a plurality of optical fibers each including a first optical fiber segment, a second optical fiber segment, and a splice joint, wherein for each optical fiber of the plurality of optical fibers:
        the first optical fiber segment comprises a first mode-field diameter, a first pre-coated section, and a first stripped section;
        the second optical fiber segment comprises a second mode-field diameter and a second stripped section, wherein the second mode-field diameter differs from the first mode-field diameter; and
        the splice joint is arranged between ends of the first stripped section and the second stripped section;
    for each optical fiber of the plurality of optical fibers, applying a recoating material over at least a portion of the first stripped sections, wherein the recoating material extends from the first pre-coated section in a direction toward the splice joint to form a recoated section of the first optical fiber segment;
    positioning portions of the second optical fiber segments of the plurality of optical fibers in a first plurality of grooves defined in a substrate, while causing, for each optical fiber of the plurality of optical fibers, (i) a first portion of the recoated section of the first optical fiber segment to overlap the substrate, and (ii) a second portion of the recoated section of the first optical fiber segment to extend beyond a first end of the substrate, wherein the substrate comprises a second end that opposes the first end, each optical fiber of the plurality of optical fibers extends from the first end to beyond the second end, and a length of the substrate extending between the first end and the second end is less than or equal to about 3 mm; and
    positioning a cover element to overlap at least a portion of the substrate over the first plurality of grooves, with the portions of the second optical fiber segments arranged between the substrate and the cover element.

2. The method of claim 1, further comprising applying an adherent material to adhere the cover element to the substrate, wherein the adherent material is arranged to encapsulate the plurality of optical fibers in areas in which the plurality of optical fibers overlap the substrate.

3. The method of claim 1, further comprising,
    forming the splice joint for each optical fiber of the plurality of optical fibers, wherein forming the splice joint comprises:
        stripping a coating from a portion of a pre-coated first optical fiber to form the first optical fiber segment with the first stripped section;
        stripping a coating from a portion of a pre-coated second optical fiber to form the second optical fiber segment with the second stripped section; and
        fusion splicing ends of the first stripped section and the second stripped section to form the splice joint.

4. The method of claim 3, wherein for each optical fiber of the plurality of optical fibers, the applying of the recoating material comprises applying the recoating material over the first stripped section, the splice joint, the second stripped section, and a portion of the first pre-coated section.

5. The method of claim 4, further comprising, for each optical fiber of the plurality of optical fibers, stripping a portion of the recoating material from at least a portion of the second stripped section.

6. The method of claim 1, further comprising, for each optical fiber of the plurality of optical fibers:
    cutting a portion of the second stripped section extending beyond the cover element to form a cut end; and
    processing the cut end to be substantially flush with the cover element and the substrate proximate to a second end of the substrate, wherein the second end opposes the first end.

7. The method of claim 1, wherein:
    the substrate comprises a flat region and an elevated region;
    the first plurality of grooves is defined in the elevated region; and for each optical fiber of the plurality of optical fibers, the first portion of the recoated section of the first optical fiber segment overlaps the flat region.

8. The method of claim 7, wherein for each optical fiber of the plurality of optical fibers, the splice joint is positioned over the flat region.

9. The method of claim 1, wherein the first mode-field diameter is in a range of 9 to 11 microns, and the second mode-field diameter is in a range of 2 to 6 microns.

* * * * *